United States Patent [19]

Mountz

[11] Patent Number: 4,722,109
[45] Date of Patent: Feb. 2, 1988

[54] RAMP FOR TRUCKS AND THE LIKE
[75] Inventor: Elton E. Mountz, Morgantown, Pa.
[73] Assignee: Morgan Corporation, Morgantown, Pa.
[21] Appl. No.: 771,310
[22] Filed: Aug. 30, 1985
[51] Int. Cl.$^4$ ............................................. E01D 1/00
[52] U.S. Cl. ..................................... 14/71.1; 414/537
[58] Field of Search ................ 14/69.5, 71.1; 414/537, 414/538

[56] References Cited

U.S. PATENT DOCUMENTS 3,511,393  5/1970  Ambyomauage et al. ...... 14/71.1 X
4,198,187  4/1980  Mountz ................................ 414/537
4,242,032  12/1980  Whiteman et al. .................. 414/537

Primary Examiner—George A. Suchfield
Attorney, Agent, or Firm—Z. T. Wobensmith, III

[57] ABSTRACT

A ramp for trucks and the like is disclosed for use with a truck body, which includes parallel spaced rails extending longitudinally of the truck, secured to the truck chassis, of the I-beam type, carrying at least one trolley which is movable longitudinally in a track formed by the rails, which supports a carriage which is connected to side frame bars which are pivotally connected to the ramp, the carriage being positioned when the forward end of the ramp exits the truck body, so as to assist hooks on the forward end of the ramp to engage in openings in the truck body, while the rear end of the ramp rests on the ground.

6 Claims, 7 Drawing Figures

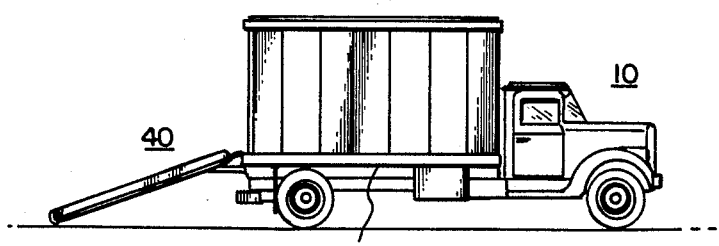
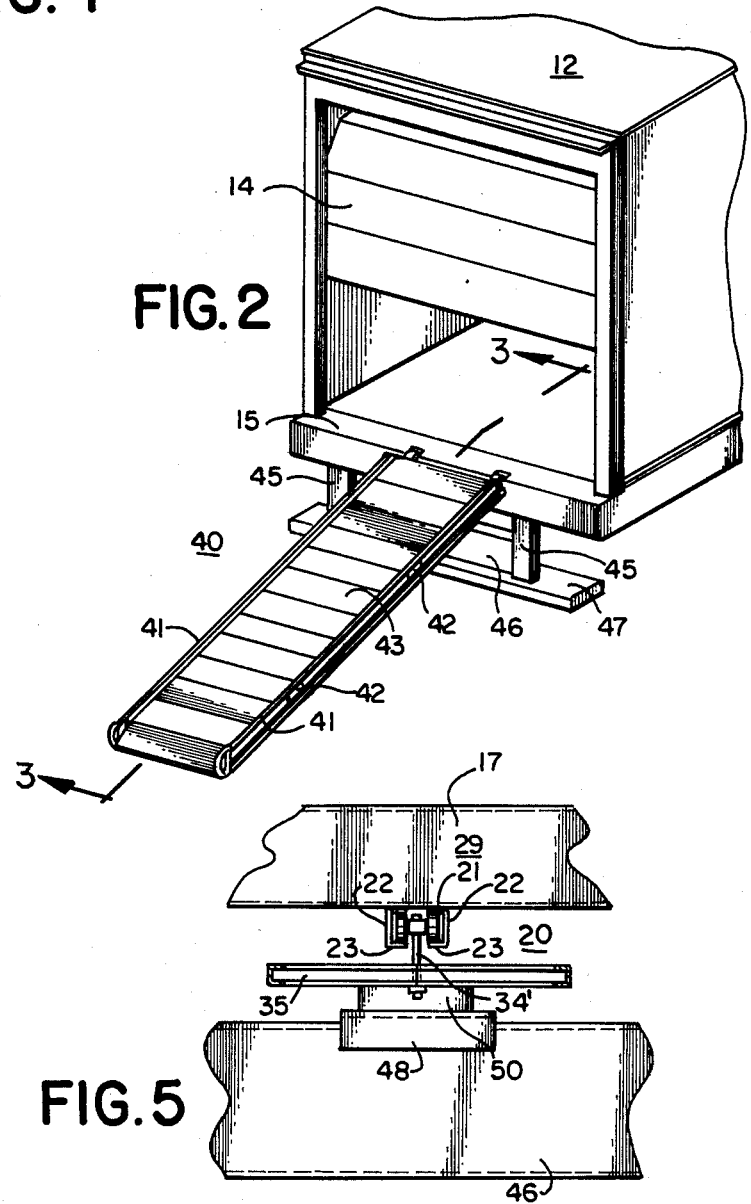
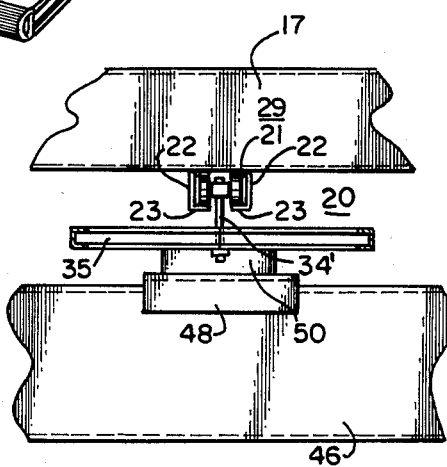

RAMP FOR TRUCKS AND THE LIKE

BACKGROUND OF THE INVENTION

1. Field of the Invention

This invention relates to ramps for trucks, which ramps are stored beneath the truck body and removable for engagement with the truck body and the ground for use.

2. Brief Description of the Prior Art

Ramps that enable one to move goods from the bed of an elevated truck body onto the ground or vice versa are well known in the art.

One such structure is shown in the Whiteman et al. U.S. Pat. No. 4,242,032 wherein the ramp is engaged by a carrier which has a trolley attached thereto, and is carried in rails beneath the truck body, which rails are attached to the truck chassis. The ramps of necessity are constructed of metal and are designed to withstand heavy goods. One of the difficulties encountered in using this and other similar ramps, is that the end of the ramp which is engaged in openings in the bed of the truck, requires manual lifting and engagement. The ramps of necessity are constructed of metal and are designed to withstand heavy loads.

The prior art ramp carriers which support the ramp while it is stored are adequate for that purpose but do not support the ramp forward end for engagement when it is withdrawn from underneath the truck bed. The amount of manual effort required to lift up the forward end of the ramp to engage it in the truck bed opening is considerable and the maneuver is complicated when the ground surface is uneven or the ramp is slippery due to moisture or mud.

The apparatus of the invention provides for automatically lifting the forward end of the ramp as it is being withdrawn from underneath the truck bed, and positions it for easy engagement in the truck bed without the problems associated with prior art structures.

SUMMARY OF THE INVENTION

In accordance with the invention a ramp for truck bodies is provided which ramp is normally stored beneath the truck body and track member by a carrier and a trolley, which trolley is engaged with longitudinal rails along and underneath the truck body, the ramp being removable for use and having its forward end automatically moved upwardly to locate and position it for engagement in openings in the bed of the truck body.

It is the principal object of the invention to provide a ramp for trucks and the like that is stored underneath the truck body and its forward end when removed is moved upwardly for engagement.

It is a further object of the invention to provide a ramp of the character aforesaid which can be easily manipulated for use.

It is a further object of the invention to provide a ramp of the character aforesaid which has a greater degree of safety and support than previously available ramps.

It is a further object of the invention to provide a ramp of the character aforesaid which can be used with a wide variety of trucks.

It is a further object of the invention to provide a ramp of the character aforesaid which is sturdy and reliable in operation and use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a side elevational view of a truck and truck body with the ramp of the invention in extended position for use;

FIG. 2 is a view in perspective of the rear end of the truck body of FIG. 1 with one embodiment of ramp in accordance with the invention in extended position for use;

FIG. 5 is a fragmentary vertical sectional view taken approximately on the line 5—5 of FIG. 4;

Figure 3:
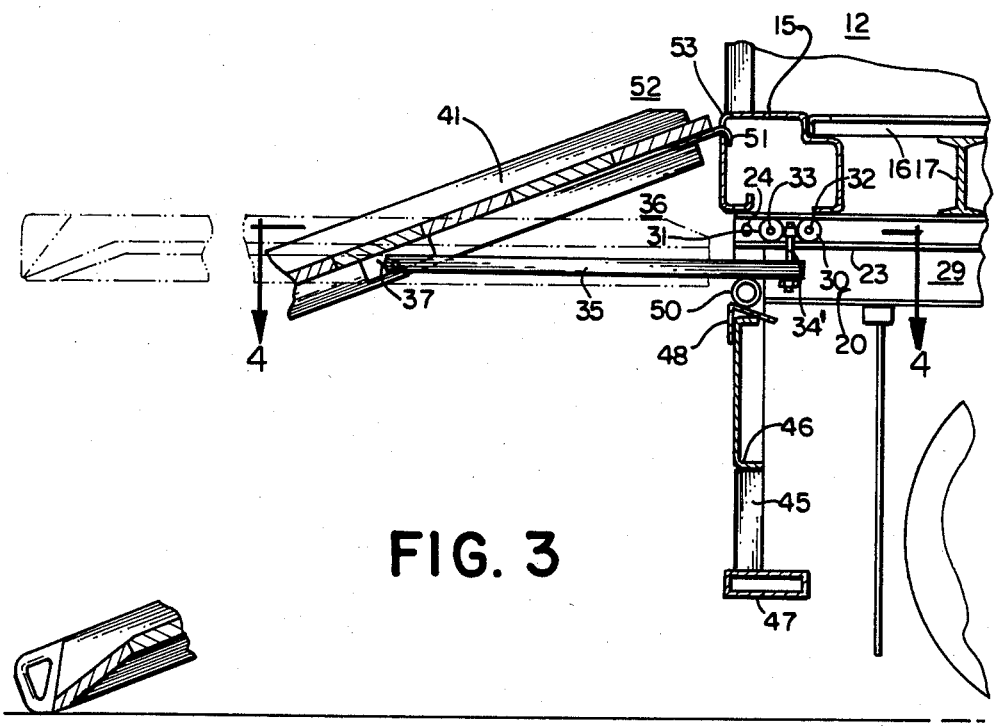
FIG. 3 is a longitudinal sectional view, enlarged, taken approximately on the line 3—3 of FIG. 2.
Figure 4:
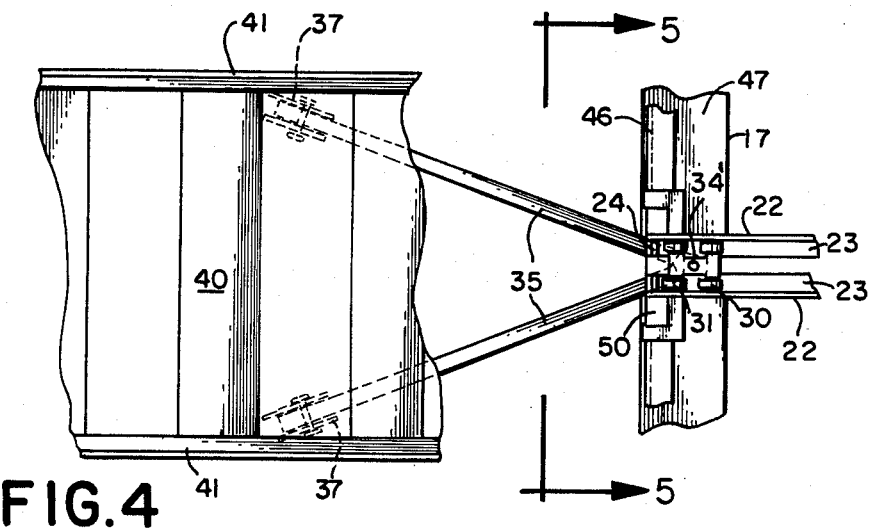
FIG. 4 is a fragmentary horizontal sectional view, taken approximately on the line 4—4 of FIG. 3.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings and FIGS. 1 to 5, inclusive, a truck 10 is shown with a chassis 11 which has a truck body 12 thereon of well known type, and fastened thereto in well known manner. The truck body 12 has a sliding overhead door 14 which can engage a sill plate 15 in closed position. The truck body 12 preferably has parallel spaced longitudinally extending frame rails 16 secured thereto of the I-beam type, with transverse cross beams 17 secured thereto by welding, and to which the truck body 12 is secured.

The cross beams 17 and the rear sill plate 15 preferably have a track member 20 secured to their lower faces, and centrally of the body 12. The track 20 has a top wall portion 21 secured to the cross beams 17 and sill plate 15 with spaced downwardly extending parallel side wall portions 22, and inwardly extending horizontal bottom wall portions 23. A horizontal stop pin 24 is provided at the rear end of the track 20 for limiting motion along the track.

The track 20 is adapted to carry a trolley 29 which has forward and rear pairs of wheels 30 and 31 on shafts 32 and 33 carried in a central trolley frame 34. A support rod 34' is provided which extends downwardly from the frame 34, to and through a pair of side frame bars 35 at their intersection in pivotally supporting relation thereto.

The side frame bars 35 are connected at their rear ends by hinges 37 to the underside of a ramp 40 such as a walk ramp. The ramp 40 has a ramp body with side frame bars 41 and a ramp floor 43 preferably of planking therebetween and below the upper faces of the frame bars 41. The outer ends of the frame bars 41 are preferably provided with handles 42 to facilitate moving the ramp 40.

Suitable positioning spacers (not shown) are provided to guide and prevent unwanted sidewise shifting of the ramp 40 when it is in the stored out of use position.

At the outer end of and below the track 20 two vertical members 45 are provided secured to the chassis 11, with a transverse member 46 connecting them and with a lower horizontal transverse plate member 47 fastened thereto. The transverse member 46 has an inclined L-shaped cam plate 48 fastened thereto which can be engaged by a horizontal tube 50 which is fastened underneath the side frame bars 35, which are forced upwardly when tube 50 is moved rearwardly over cam 48.

The upward movement of tube 50 and frame bars 35 causes hooks 51 carried on the forward end 52 of ramp 40, to be positioned for easy insertion into openings 53 in sill plate 15 when ramp 40 is in its outward or extended position for use.

The ramp 40 can also be provided with a catch (not shown) for engagement with cam 48 for underneath out of use storage of the ramp 40.

Figure 6:
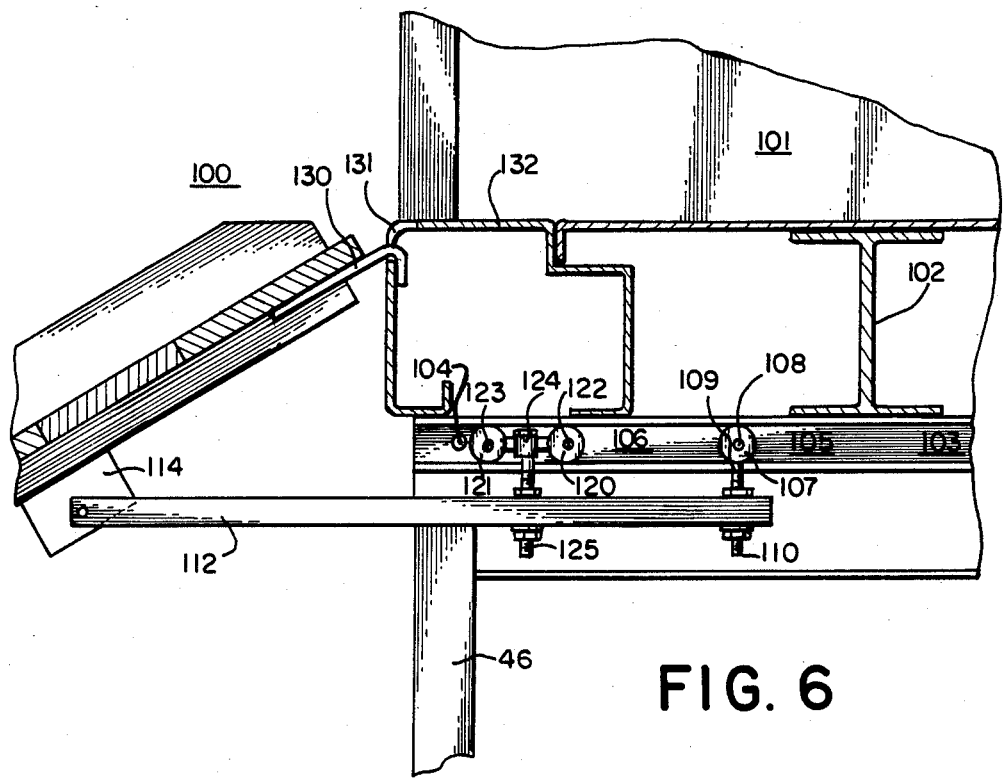
FIG. 6 is a view similar to FIG. 3 showing another embodiment of ramp in accordance with the invention.

Referring now more particularly to FIG. 6 another embodiment of ramp 100 is disclosed on a truck body 101 which is carried on cross beams 102, which are secured to the chassis (not shown) of a truck (not shown).

The cross beams 102 have a longitudinal track 103 fastened thereto which has a stop pin 104 and is adapted to carry a front trolley 105 and a rear trolley 106. The front trolley 105 has a pair of wheels 107 on shaft 108 which wheels are engaged with track 103, and carried in a trolley frame 109 which has a support rod 110 which extends downwardly and is engaged with an extension 113 of a pair of side frame bars 112. The side frame bars 112 are connected at their rear ends by hinges 114 to the underside of a ramp 100 as described for FIGS. 1 to 5.

The rear trolley 106 has forward and rear pairs of wheels 120 and 121 on shafts 122 and 123 engaged with track 103 and carried by a trolley frame 124. The trolley frame 124 has a support rod 125 which extends downwardly and is engaged with the side frame bars 112 at their intersection.

The truck body 101 has vertical members secured to the chassis (not shown) which carry a transverse member 46.

When the ramp 100 is moved out of the truck along the track 103, the side frame bars 112 are rigidly supported by the dual trolley arrangement so that hooks 130 of ramp 100 are positioned to be easily engaged in openings 131 in sill plate 132 for use as desired.

Figure 7:
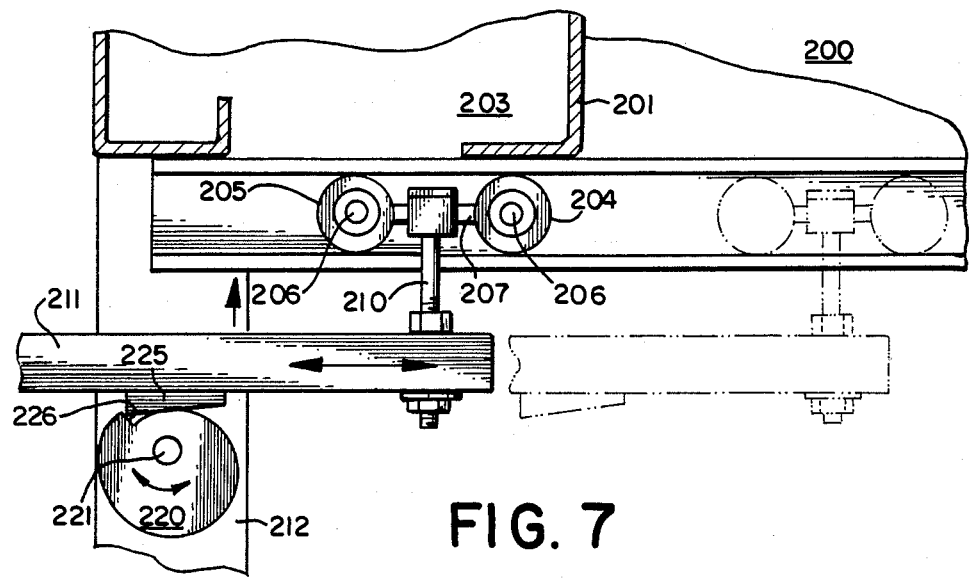
FIG. 7 is an enlarged fragmentary sectional view similar to FIG. 6 illustrating still another embodiment of ramp in accordance with the invention.

Referring now more particularly to FIG. 7 another embodiment of ramp for trucks and the like is disclosed on a truck body 200 of well known type as described above, which includes a chassis (not shown) transverse members 201 and a longitudinal track 202 which is adapted to carry a trolley 203 with forward and rear pairs of wheels 204 and 205 engaged with the track 202 and carried in shafts 206 in a trolley frame 207. The trolley frame 207 has a downwardly extending support rod 210 which is engaged with a pair of side frame bars 211 which are connected to a ramp (not shown) in well known manner.

The truck body 200 has a pair of downwardly extending members 212 which are connected to the truck chassis (not shown) and carry a rotary cam member 220 therebetween on shaft 221 which is engaged in members 212. The side frame bars 211 have a plate 225 thereon extending transversely therebetween and which can engage notch 226 in cam 220 when the bars 211 and associated structure are moved out from underneath the truck body 101. When the plate 225 engages notch 226, cam 220 rotates counterclockwise, and as bars 211 are moved further out the bars 211 are lifted upwardly as described for FIGS. 1 to 5 and 6 to enable hooks (not shown) from ramp (not shown) to be engaged in openings (not shown) in sill plate (not shown) of body 200. Disengagement of the hooks (not shown) of ramp (not shown) and movement of side frame bars 211 back underneath the truck body 200 causes cam 220 to rotate in the opposite direction and bars 211 to move downwardly for storage and positioning underneath the truck body 200.

It will thus be seen that apparatus has been provided with which the objects of the invention are achieved.

I claim:

1. A ramp for use with trucks and the like wherein the truck has a chassis and a truck body carried on said chassis, the improvement which comprises parallel spaced frame rails underneath said truck body, a track member parallel to and extending between said rails and fastened to said truck chassis, trolley means movable along and carried in said track, side frame bars connected to said trolley means, a ramp hingedly connected to said side frame bars and movable therewith underneath said truck body, said ramp having a forward end, hooks carried by said forward end of said ramp for engagement in said body for ramp use, and wherein said movement of said ramp forward end from underneath said truck body in combination with said trolley means automatically locates said hooks for ready engagement in said body.

2. A ramp as defined in claim 1 in which vertical members extend downwardly from said chassis adjacent the rear of said truck, cam means extend between and carried by said vertical members, and means are carried by said side frame bars to engage said cam means to force said trolley means, said frame bars and said ramp forward end upwardly to locate said hooks for ready engagement in said body upon removal of said ramp hooks from underneath said truck body.

3. A ramp as defined in claim 2 in which said cam means includes a transverse member connecting said vertical members, an inclined cam plate connected to said transverse member, and a tube carried by said side frame bars for engagement with said cam plate.

4. A ramp as defined in claim 2 in which said cam means include a rotary cam carried on a shaft which engages said vertical members, a notch in said cam for engagement for rotation, and a plate carried by said side frame bars for engagement with said rotary cam for rotation thereof for lifting of said bars and said ramp for engagement for use.

5. A ramp as defined in claim 1 in which
said trolley means includes a trolley frame,
at least two pairs of wheels carried on shafts in said frame and engaged in said track, and
a support rod extending downwardly from said trolley frame and connected to said side frame bars.

6. A ramp as defined in claim 5 in which
said means adjacent said trolley means for positioning include an extension carried on said frame bars, and
additional trolley means carried on said extension and engaged with said track.

* * * * *